(12) United States Patent
Schmale et al.

(10) Patent No.: US 7,845,610 B2
(45) Date of Patent: Dec. 7, 2010

(54) ADJUSTING DEVICE FOR A MOTOR VEHICLE SEAT

(75) Inventors: Uwe Schmale, Huckeswagen (DE); Jurgen Otto, Burscheid (DE)

(73) Assignee: Johnson Controls Technology Company, Holland, MI (US)

( * ) Notice: Subject to any disclaimer, the term of this patent is extended or adjusted under 35 U.S.C. 154(b) by 134 days.

(21) Appl. No.: 12/088,494

(22) PCT Filed: Aug. 29, 2006

(86) PCT No.: PCT/EP2006/008450

§ 371 (c)(1),
(2), (4) Date: Aug. 7, 2008

(87) PCT Pub. No.: WO2007/039028

PCT Pub. Date: Apr. 12, 2007

(65) Prior Publication Data

US 2008/0308703 A1    Dec. 18, 2008

(30) Foreign Application Priority Data

Sep. 30, 2005    (DE) .................. 10 2005 047 452

(51) Int. Cl.
*F16M 13/00* (2006.01)
(52) U.S. Cl. ...................... 248/424; 248/903
(58) Field of Classification Search ............ 248/424, 248/429, 430, 903; 297/344.11; 74/527
See application file for complete search history.

(56) References Cited

U.S. PATENT DOCUMENTS

| | | | | |
|---|---|---|---|---|
| 1,313,113 | A | * | 8/1919 | Pleister .................. 248/74.5 |
| 1,865,185 | A | | 6/1932 | Greenwald |
| 3,544,053 | A | * | 12/1970 | Ingalls .................. 248/219.3 |
| 4,177,659 | A | | 12/1979 | van Geffen |
| 4,428,214 | A | | 1/1984 | Head, Jr. et al. |
| 5,234,189 | A | * | 8/1993 | Myers .................. 248/429 |
| 5,564,315 | A | * | 10/1996 | Schuler et al. ............ 74/527 |
| 5,596,910 | A | * | 1/1997 | Bauer et al. ............. 74/526 |
| 5,782,138 | A | | 7/1998 | Groche |
| 5,816,110 | A | * | 10/1998 | Schuler et al. ............ 74/527 |
| 2003/0150971 | A1 | | 8/2003 | Becker et al. |

FOREIGN PATENT DOCUMENTS

| | | |
|---|---|---|
| DE | 28 02 229 A1 | 3/1978 |
| DE | 3022344 A1 | 12/1981 |
| DE | 4436882 | 4/1996 |
| DE | 19612619 | 10/1997 |
| DE | 101 49 546 A1 | 4/2003 |
| EP | 0 085 888 A2 | 1/1983 |
| EP | 1316465 | 6/2003 |

* cited by examiner

*Primary Examiner*—Ramon O Ramirez
(74) *Attorney, Agent, or Firm*—Butzel Long

(57) ABSTRACT

An adjusting device for a vehicle seat has a sheet metal structure with at least one recess which can be brought into interlocking engagement with a locking element. According to the disclosure, it is provided that the recess is provided with an at least partially encircling bead.

13 Claims, 2 Drawing Sheets

ADJUSTING DEVICE FOR A MOTOR VEHICLE SEAT

BACKGROUND

Figure 1:
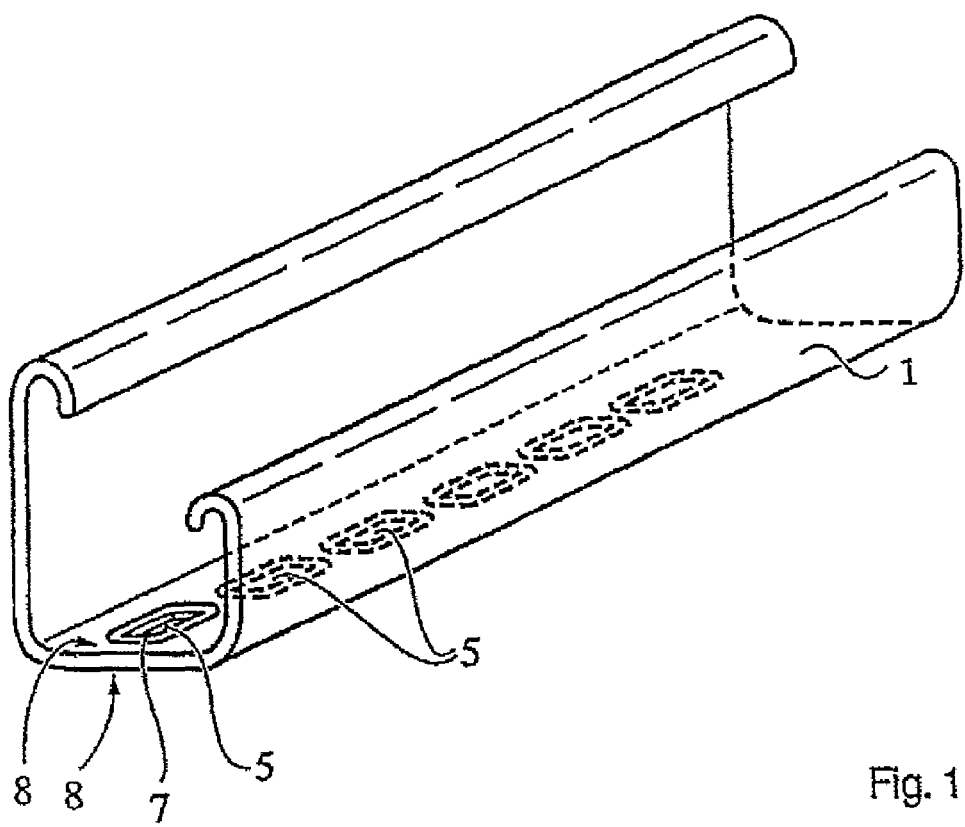

The disclosure relates to an adjusting device for a vehicle seat which has a sheet metal structure with at least one recess which can be brought into interlocking engagement with a locking element.

German Patent Application DE 103 46 147 A1 discloses a generic adjusting device for longitudinal adjustment of a vehicle seat along a rail. It comprises an arrangement of adjusting elements which are arranged in the upper rail of the seat and have extensions in the manner of locks which enter in an alternating manner into interlocking engagement with recesses let into the lower rail and, in the process, undergo a movement component directed along the rail. By this means, the upper rail is displaced steplessly relative to the lower rail upon rotation of eccentrics which drive the adjusting elements. The forces required for this purpose are transmitted by contact of the extensions with the lower rail in the region of the recess, as are forces which occur during operation of the vehicle. Of course, particularly high forces occur in the event of an accident. Even in the event of this, the locking engagement of the extensions in the recesses must not fail.

The disclosure is based on the object of improving the safety of generic adjusting devices using simple means.

SUMMARY

A recess is provided with an at least partially encircling bead. Said bead which extends at least in the contact region between locking element and sheet metal structure reduces the surface pressures and the risk of the recess being deformed. This leads to an increase in the forces which can be transmitted by the locking element to the sheet metal structure.

The bead advantageously surrounds the entire circumference of the recess and can extend over both planar sides of the sheet metal structure which is preferably composed of steel. When the recesses are being punched out of the sheet metal structure, the bead can be produced in a particularly simple manner by plastic deformation with a considerable effect if the wall thickness in the region of the bead is 1.1 times to 1.5 times, in particular approximately 1.3 times the wall thickness of those regions of the sheet metal structure which surround the bead, and the width of the bead is 0.25 times to 1.0 times, in particular approximately 0.5 times the wall thickness of those regions of the sheet metal structure which surround the bead.

The recess preferably has an essentially rectangular or oval contour, with the corners of the rectangular recess being provided with generous radii. These designs reduce stress concentrations when the adjusting device is subjected to a load.

The sheet metal structure of the adjusting device particularly advantageously has a linear sequence of recesses with in each case an at least partially encircling bead enabling the vehicle seat to be locked in different positions. Since the distance between the recesses is preferably designed to be small, so as to keep the change in position of the vehicle seat between two adjacent locking positions small, the strength of those regions of the sheet metal structure which connect the recesses obtains particular importance. In order to obtain a particularly uniform design of the beads, it can be provided that each bead of a recess is separated from the bead of the adjacent recess by a region of reduced wall thickness.

The sheet metal structure advantageously constitutes part of a seat rail, in particular a lower rail of the seat, which is suitable for the linear adjustment of a vehicle seat, for example for displacement of the seat in or counter to the direction of travel.

FIGURES

The figures are exemplary representations of schematically different embodiments disclosed.

Figure 2:
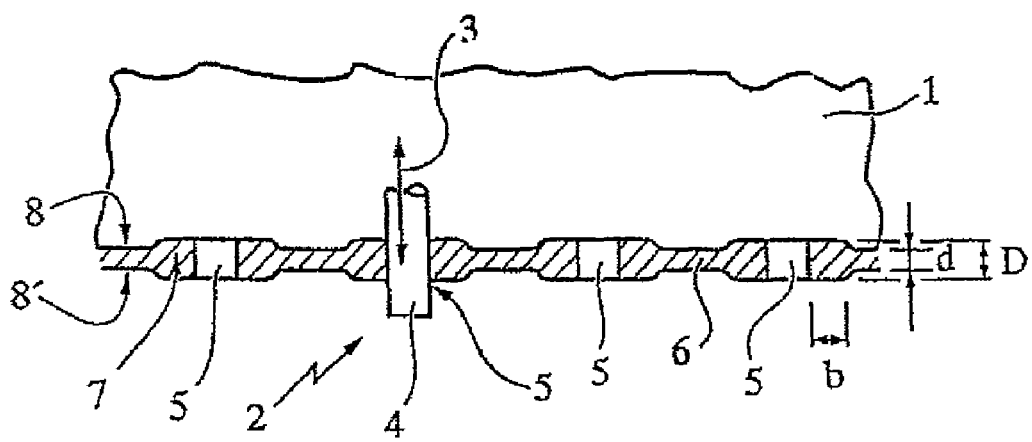
Figure 3:
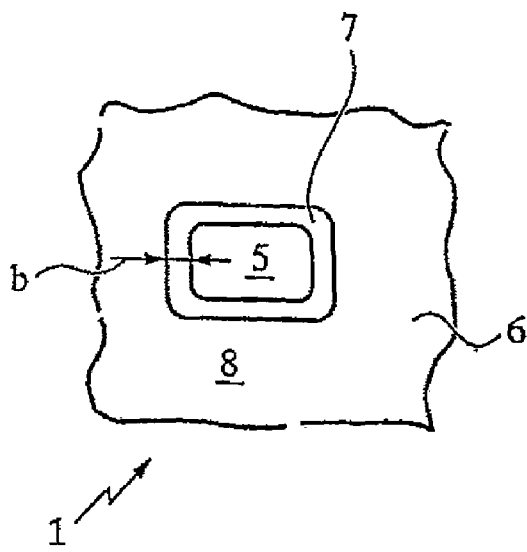
Figure 4:
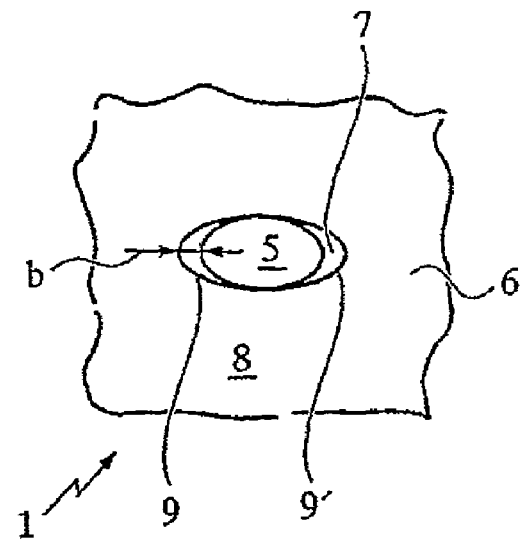
Figure 5:
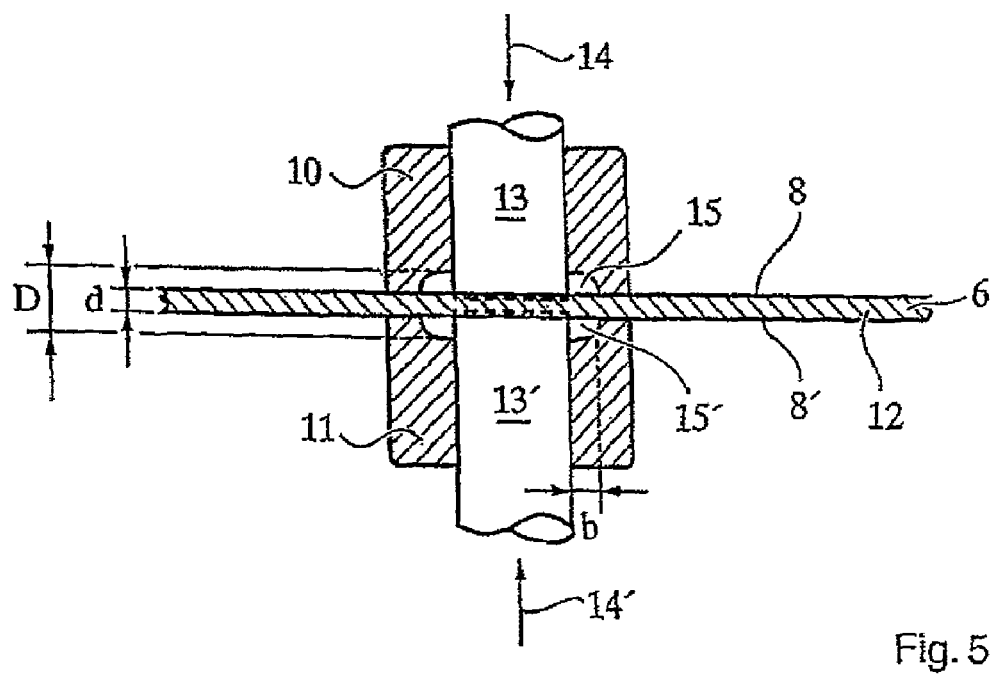

In the figures:

FIG. 1 shows the perspective view of a lower rail of a vehicle seat that is designed according to an exemplary embodiment, FIG. 2 shows a longitudinal section through the lower rail according to FIG. 1 with the locking element in engagement, FIG. 3 shows a plan view of a recess according to a first exemplary embodiment, FIG. 4 shows the plan view of a differently designed recess, FIG. 5 shows a section through a tool suitable for producing a sheet metal structure according to an exemplary embodiment.

The lower rail 1 illustrated in FIGS. 1 and 2 is part of an adjusting device 2 for the longitudinal adjustment of a vehicle seat. The adjusting device 2 has a bolt-like locking element 4 which can be displaced in the direction of the arrow 3 and is connected to the upper rail (not shown) of the adjusting device 2. For the adjustable displacement of the upper rail in relation to the lower rail 1, the locking element 4 is brought into a position in which it is not in engagement with the lower rail 1. In order to fix the adjusted seat position, the locking element 4 can be brought into interlocking engagement with one of a plurality of identical recesses 5 which are punched into the sheet metal structure 6 of the lower rail 1 in a linear, equidistant arrangement along the longitudinal axis thereof.

The entire circumference of each recess 5 is surrounded by a bead 7 which extends over both planar sides 8, 8' of the sheet metal structure 6. The wall thickness D of the sheet metal structure 6 in the region of the bead 7 is approximately 1.3 times the wall thickness d on the other side of the bead 7 while the width b of the bead 7 corresponds approximately to half the wall thickness d.

As can be seen from FIG. 3, the bead 7 may encircle in an essentially constant width b around the contour of a rectangular recess 5. As an alternative, it is conceivable to arrange the bead 7 only partially around the recess; with reference to the example in FIG. 4 of two sickle-shaped bead segments 9, 9' which reach their greatest width b at those regions of the recess 5 which are subjected to the highest load.

A punching tool suitable for producing adjusting devices 2 includes, as illustrated in FIG. 5, an upper tool 10 and a lower tool 11 which are placed onto a respective planar side 8, 8' of the flat sheet metal blank 12 of the sheet metal structure 6. Upper and lower tools 10, 11 are equipped with punches 13, 13' which are movable in the direction of the planar sides 8, 8' (arrows 14, 14') and punch the recess 5 out of the sheet metal blank 12. During this operation, material of the sheet metal blank 12 is pressed by plastic deformation into the grooves 15 which surround the punches 13, 13' and are approximately of the sizes D, b of the bead 7 produced by them. The sheet metal blank 12 which is thereby provided with recesses 5 is subsequently shaped by tilting or rolling to form a rail profile.

What is claimed is:

1. An adjusting device for a vehicle seat, comprising:
a first structure having a first and second planar side, and at least one recess having a predetermined contour;

a locking element which can be brought into interlocking engagement with the recess; and a bead that extends over each of the first planar side and the second planar side of the first structure, such that the bead distributes an applied load from the locking element across the recess to lock the locking element in the recess, and wherein the bead is formed around the entire circumference of the recess by plastic deformation of the bead around the edges of the recess in the first structure.

2. The adjusting device of claim 1, wherein a wall thickness in the region of the bead is 1.1 times to 1.5 times a wall thickness of the region of the first structure which surrounds the bead.

3. The adjusting device of claim 1, wherein a width of the bead is 0.25 times to 1.0 times of a wall thickness of the region of the first structure which surrounds the bead.

4. The adjusting device of claim 1, wherein the first structure has a linear sequence of recesses with an at least partially encircling bead.

5. The adjusting device of claim 4, wherein each bead of a recess is separated from the bead of the adjacent recess by a region having a wall thickness of the first structure.

6. The adjusting device of claim 4, wherein the first structure forms part of a lower seat rail for the linear adjustment of the vehicle seat.

7. The adjusting device of claim 1, wherein a wall thickness in the region of the bead is 1.3 times the wall thickness of the region of the first structure which surrounds the bead.

8. The adjusting device of claim 1, wherein the width of the bead is 0.5 times of the region of the first structure which surrounds the bead.

9. An adjusting device for a vehicle seat, comprising:
a first structure having a first and second planar side, and at least one recess having a predetermined contour;
a locking element which can be brought into interlocking engagement with the recess;
a bead that at least partially encircles the recess, wherein the bead is formed by plastic deformation to extend over the first planar side and the second planar side of the first structure;
wherein a wall thickness in the region of the bead is 1.1 times to 1.5 times a wall thickness of the region of the first structure which surrounds the bead; and
wherein the first structure forms part of a lower seat rail for the linear adjustment of the vehicle seat.

10. The adjusting device of claim 9, wherein the first structure has a linear sequence of recesses with an at least partially encircling bead.

11. The adjusting device of claim 10, wherein each bead of a recess is separated from the bead of the adjacent recess by a region having a wall thickness of the first structure.

12. An adjusting device for a vehicle seat, comprising:
a sheet metal structure having a first and second planar side, and at least one recess having a predetermined contour;
a locking element which can be brought into interlocking engagement with the recess;
a bead that surrounds the entire circumference of the recess, wherein the bead if formed by plastic deformation to extend over the first planar side and the second planar side of the sheet metal structure;
wherein a wall thickness in the region of the bead is 1.1 times to 1.5 times a wall thickness of the region of the sheet metal structure which surrounds the bead; and
wherein the sheet metal structure forms part of a lower seat rail for the linear adjustment of the vehicle seat.

13. The adjusting device of claim 12, wherein each bead of a recess is separated from the bead of the adjacent recess by a region of having a wall thickness of the sheet metal structure.

* * * * *